Mar. 20, 1923.
M. I. GOLDSMITH
1,448,740
CHILD LIFE SAVER FOR AUTOMOBILES
Filed Dec. 14, 1922
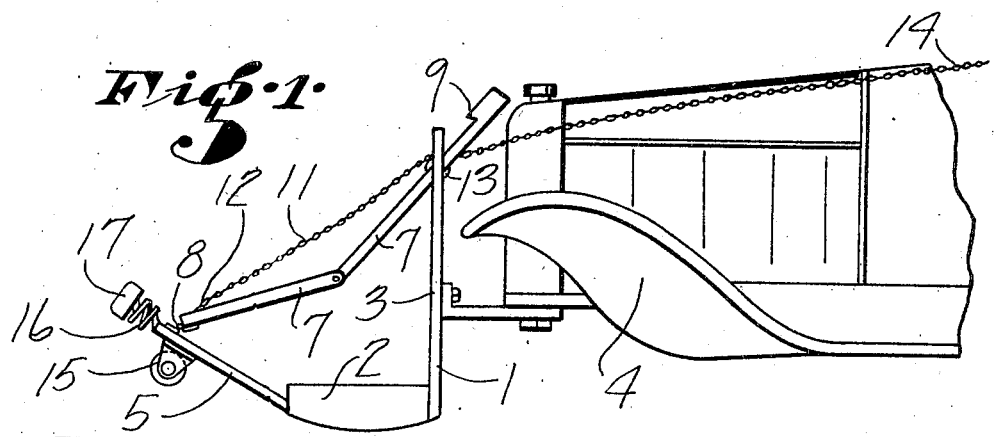
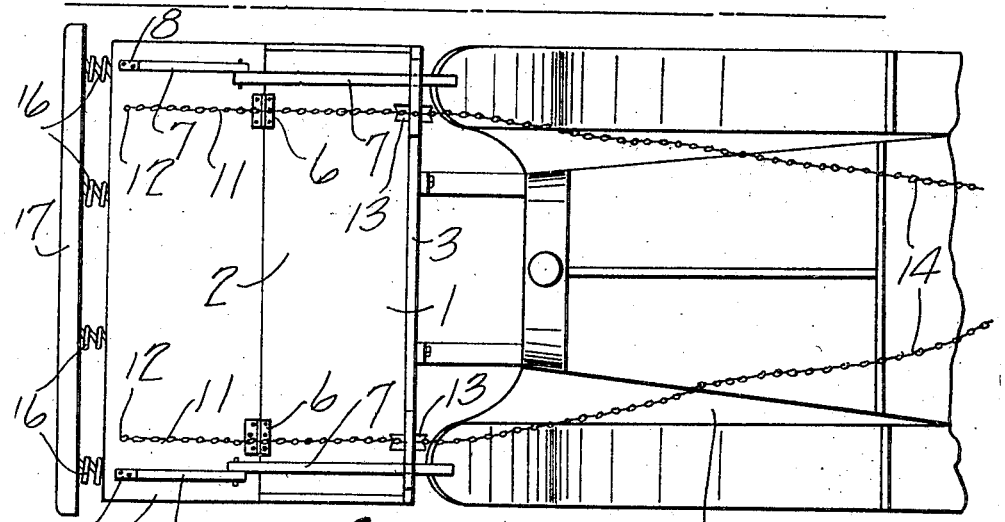
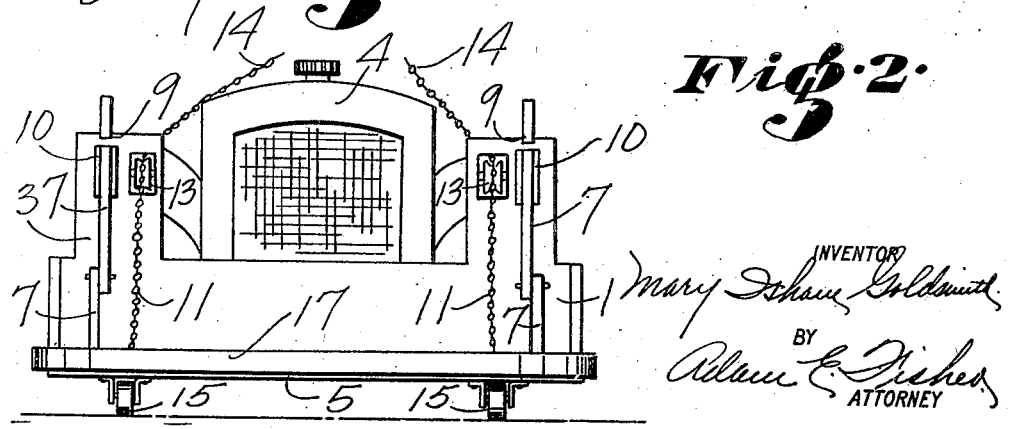

Patented Mar. 20, 1923.

1,448,740

UNITED STATES PATENT OFFICE.

MARY ISHAM GOLDSMITH, OF DENVER, COLORADO.

CHILD LIFE SAVER FOR AUTOMOBILES.

Application filed December 14, 1922. Serial No. 606,830.

*To all whom it may concern:*

Be it known that I, MARY ISHAM GOLDSMITH, a citizen of the United States, residing in the city of Denver and State of Colorado, have invented new and useful Improvements in Child Life Savers for Automobiles, of which the following is a specification, reference being had to the accompanying drawings.

This invention is a safety cradle for attachment in front of wheels at the front of an automobile, and the object is to provide a practical device of this kind which may be readily attached to any automobile or street car, and which will operate to prevent the machine from running over children or others when it appears impossible to stop the machine in time.

In the drawing:

Figure 1 is a side elevation showing the device attached to a car and in elevated position;

Figure 2 is a front view.

Figure 3 is a top view.

The invention consists of an angular frame 1 having a base portion 2 and a back portion 3, and secured in any conventional manner to the front of the car 4. A cradle 5 is hinged at 6 to the forward edge of the base 2 and so as to be raised or lowered, as desired. Toggle levers 7 are hinged at 8 to the cradle 5, and their upper ends are notched at 9 and passed through slots 10 in the back 3. These levers support the cradle 5 adjacent the ground. Chains 11 are connected at 12 to the cradle 5 and extend over pulleys 13 in the back 3, thence over the hood of the car and to the hand of the operator at 14. Caster wheels 15 are journaled at the lower front edge of the cradle 5, to carry the cradle when lowered. Coil springs 16 are mounted along the front edge of the cradle 5, and a long resilient bar 17 is secured to the front ends of these coil springs. The bar 17 may be rubber covered, if desired, to lessen danger of injury to the body of a child, and for the same purpose, the cradle and base 2 may be cushioned.

In operation and use, the cradle 5 is normally held elevated by the chains 11. In an emergency and to save a child, the chains are released by the driver and the cradle 5 falls toward the ground. The resilient structure at the front of the cradle operates to throw the child up and back onto the base 2.

While I have herein described a certain specific method of constructing and assembling the elements of my invention, it is understood same may be varied in minor details, not departing from the spirit of my invention as defined in the appended claim.

I claim:

A safety cradle for automobiles, comprising an angular frame at the front of the car, having base and back portions; a cradle hinged to the front of the base, said cradle having a resilient structure at its front edge; toggle levers supporting the cradle adjacent the ground; chains extended from the cradle to the hand of the driver; and caster wheels under the cradle.

MARY ISHAM GOLDSMITH.

Witnesses:
ARTHUR KALLMINZER,
A. E. TEICHERT.